(No Model.) 4 Sheets—Sheet 1.
M. LEVY.
DIAPHRAGM FOR PHOTOGRAPHIC LENS TUBES.
No. 532,327. Patented Jan. 8, 1895.
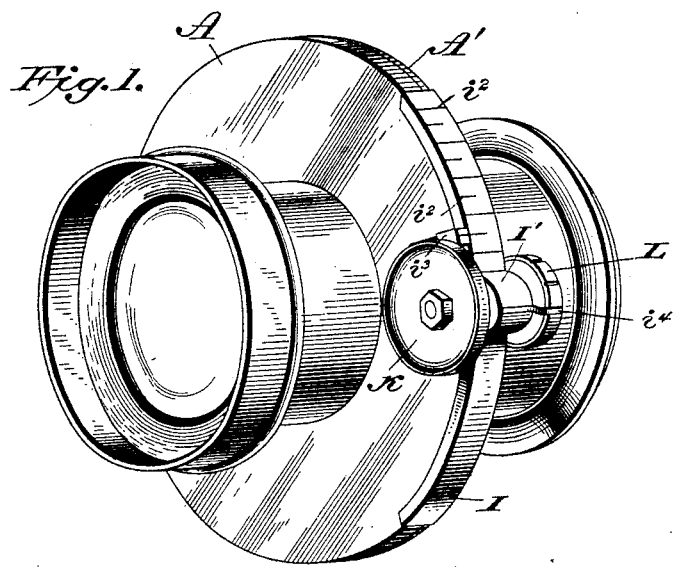
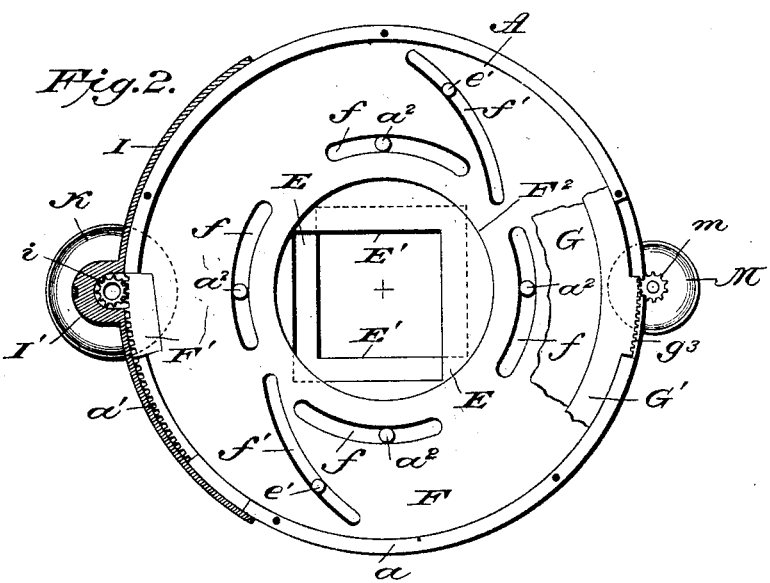

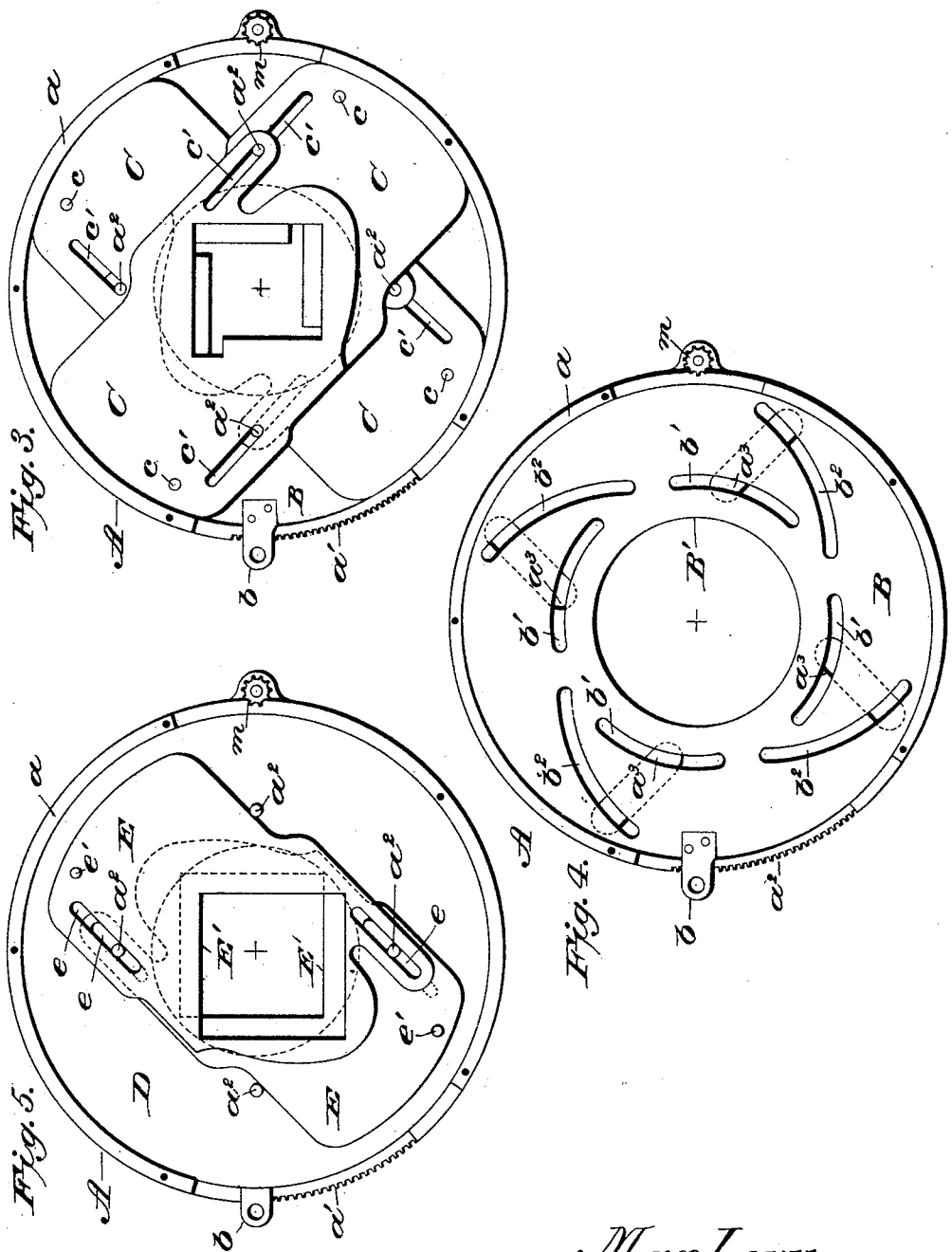

(No Model.) 4 Sheets—Sheet 3.
M. LEVY.
DIAPHRAGM FOR PHOTOGRAPHIC LENS TUBES.
No. 532,327. Patented Jan. 8, 1895.
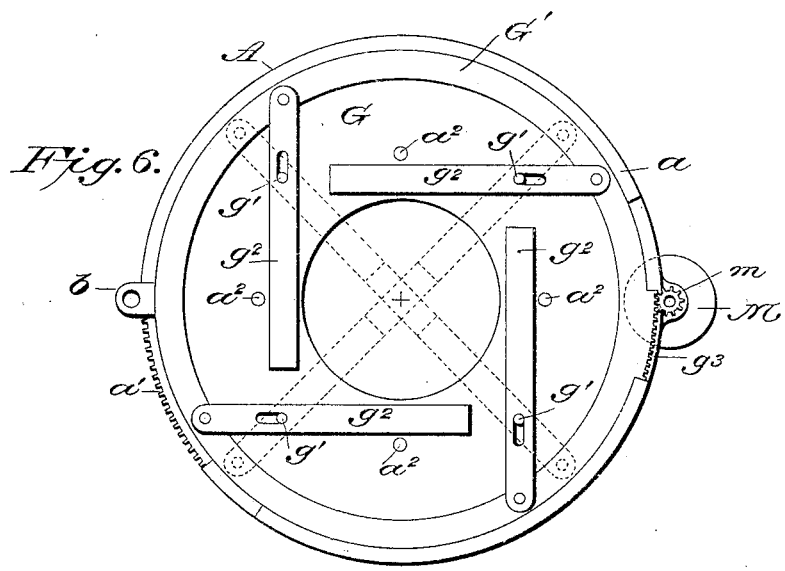
Fig. 6.
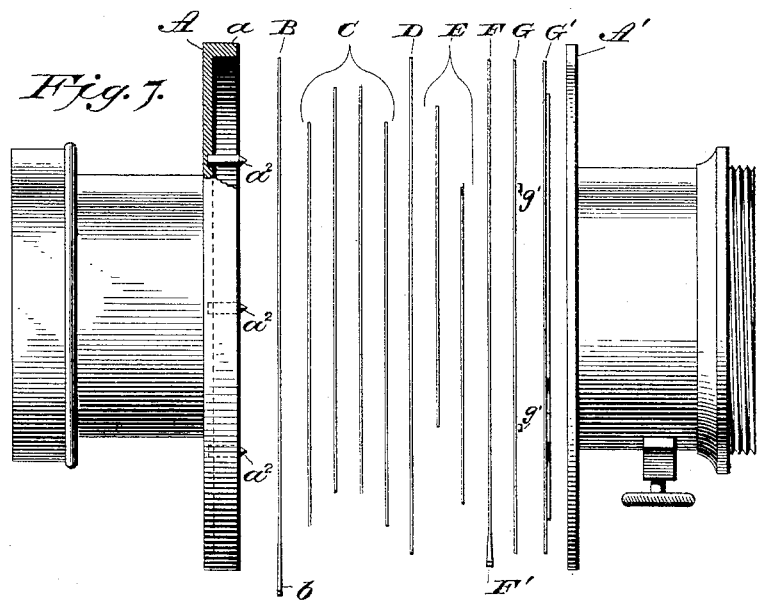
Fig. 7.
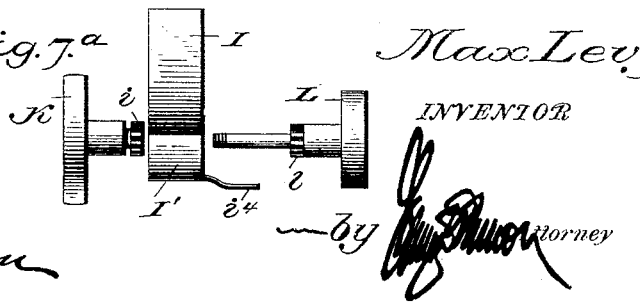
Fig. 7.ª
WITNESSES
G. S. Elliott
E. W. Johnson
Max Levy,
INVENTOR
by ——— Attorney (No Model.) 4 Sheets—Sheet 4.

M. LEVY.
DIAPHRAGM FOR PHOTOGRAPHIC LENS TUBES.

No. 532,327. Patented Jan. 8, 1895.

WITNESSES
MaxLevy
INVENTOR
by
Attorney

UNITED STATES PATENT OFFICE.

MAX LEVY, OF PHILADELPHIA, PENNSYLVANIA.

DIAPHRAGM FOR PHOTOGRAPHIC LENS-TUBES.

SPECIFICATION forming part of Letters Patent No. 532,327, dated January 8, 1895.

Original application filed August 31, 1893, Serial No. 484,458. Divided and this application filed April 12, 1894. Serial No. 507,251. (No model.)

*To all whom it may concern:*

Be it known that I, MAX LEVY, a citizen of the United States of America, residing at Philadelphia, in the county of Philadelphia and State of Pennsylvania, have invented certain new and useful Improvements in Diaphragms for Photographic Lens-Tubes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
The object of this invention is to provide an improved diaphragm for cameras comprising slides for forming an aperture of varying size and additional or supplemental slides for altering the configuration of the aperture, the diaphragm also having means for blocking out the central light, the construction being such that the parts are adjustable for giving any size aperture that may be required with extensions at the corners on one side of the aperture or all the corners.

The invention consists in the construction and combination of the parts for attaining the results set forth in my application filed August 31, 1893, bearing Serial No. 484,458, of which this application is a division; the object of the invention set forth in both applications being to produce analogous results.

Figure 9:
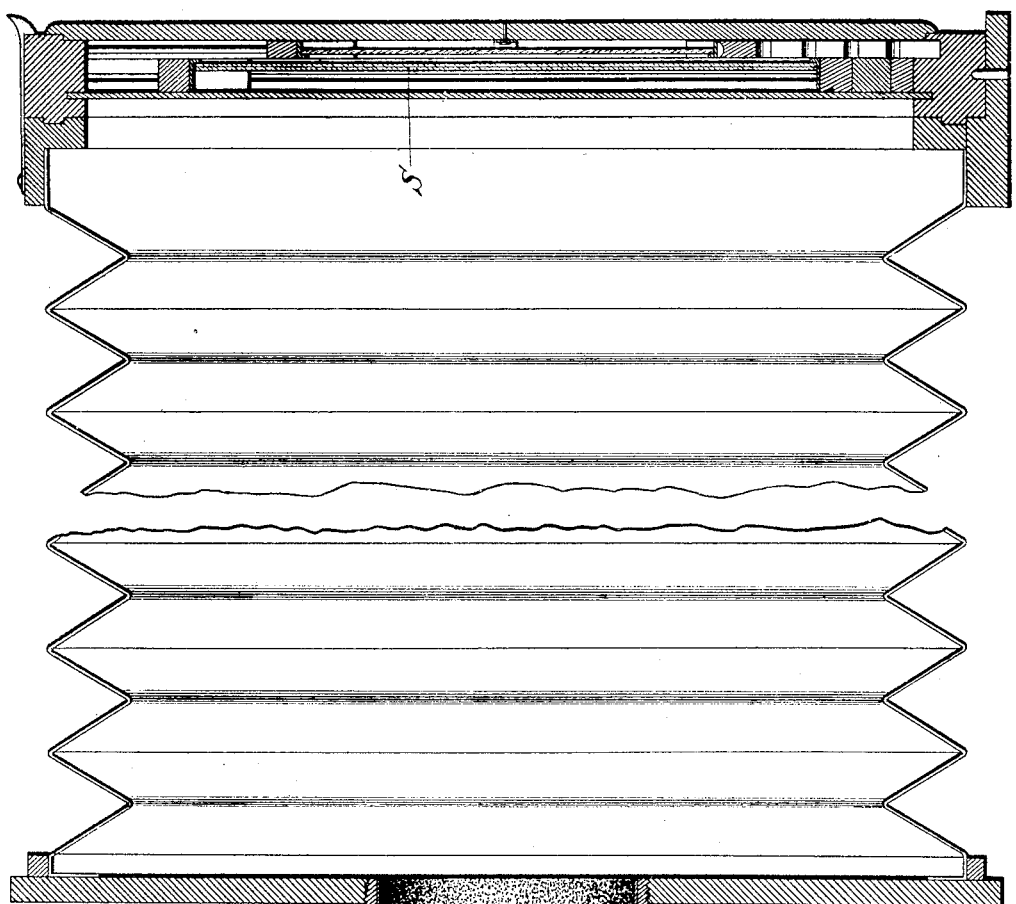
Figure 8:
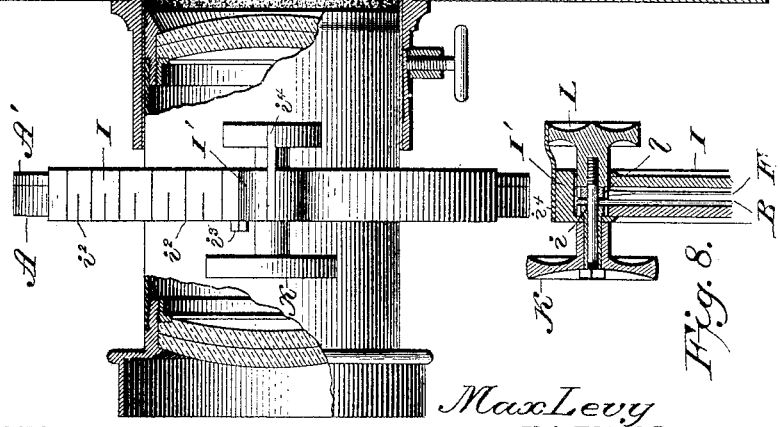

In the accompanying drawings, Figure 1 is a perspective view showing a lens-tube with my improvements applied thereto. Fig. 2 is a sectional view illustrating the disk for operating the slides forming the rectangular aperture and means for operating the arms which block out the central light. Fig. 3 is a sectional view showing the slides for producing the extended corners of the aperture. Fig. 4 is a sectional view showing the arrangement of the slots in the disk which operates the slides shown in Fig. 3. Fig. 5 is a sectional view showing the slides which form the rectangular aperture. Fig. 6 is a sectional view showing the arms for blocking out the central light and means for operating said arms. Fig. 7 is a side elevation, partly in section, showing the parts separated and in the relative position they occupy in use. Fig. 7ª is a side view of the segment and thumb nuts, separated, showing the parts carried thereby. Fig. 8 is a detail sectional view; and Fig. 9 is a side elevation, partly in section, showing the lens-tube applied to a camera box, said camera box having a plate-holder which carries a grating or screen.

In carrying out my invention I make the lens-tube in two parts to the adjoining ends of which are secured annular plates A and A' between which the parts of the diaphragm hereinafter described are placed. One of the annular plates, A, has a flange $a$ at its outer edge to which the other plate, A', is secured, and this flange is partially cut away to provide for operating the disks forming part of the diaphragm. At the outer edge of the plate A adjoining the cut away portion of the flange are formed rack-teeth $a'$, and the edge of the annular plate A' on a line with these teeth is cut away, the ends of the cut away portion forming stops for limiting the movement of the means which operate the parts of the diaphragm. One of the annular plates is provided on its inner side with projecting pins, $a^2$, which pass through the parts of the diaphragm and engage corresponding recesses in the other annular plate.

The rear part of the lens-tube is preferably provided with a collar having means for attaching the same to the camera, so that the position of the lens-tube can be changed.

B designates a disk forming part of my improved diaphragm which is provided with a projection $b$ extending beyond the edges of the annular plates A and A' to provide means for turning disk B. The disk B has a central opening B' of substantially the same size as the opening in the lens-tube, and adjacent to this opening are slots $b'$ which are curved concentric therewith and through which the pins $a^2$ pass. The disk is also provided with eccentric slots $b^2$ through which pass pins or studs $c$ projecting from the slides C C which form the extended corners of the aperture in the diaphragm, the annular plate A having recesses $a^3$ which provide paths for the ends of the pins or studs.

The slides C C are each provided with a rectangular aperture one of the corners of which is extended, and these slides have also slots $c'$ through which the pins $a^2$ pass and pins or studs $c$ engaging the slots $b^2$ in the disk B as hereinbefore set forth. The slots $c'$ extend on a straight line at nearly an angle of forty-five degrees from the adjacent sides of the rectangular aperture, both slots being on lines parallel with each other. In practice four of the slides C are used, and they are superimposed or placed one against the other in such position that the extended corners of the apertures will lie at the different corners of the aperture formed by all of the slides. To hold the slides C more securely in place they are covered by a centrally apertured disk D provided with perforations through which the pins $a^2$ pass. At this point it will be noted that with the parts of the diaphragm so far described by simply moving the disk B the slides C will be operated to provide a rectangular aperture with four extended corners, the extensions being of equal length, and that as the disk is moved to increase the size of the aperture formed by the slides the width of the extended corners will be relatively increased, the slides moving upon each other to produce such result.

E E designate two slides for forming the rectangular aperture, each slide having a rectangular aperture E' and slots $e$ therein, and also a pin or stud $e'$ which engages with an eccentric slot in the disk F, hereinafter described, for moving the slide. The slots $e$ each extend on a straight line at an angle of forty-five degrees from the adjacent side of the rectangular aperture. The apertures in the slides E are of the same size but are formed therein so that when said slides are placed in position between the annular plates with the pins $a^2$ extending through the slots $e$ the center of one of them will be at a greater distance from the axis of the lens than the other, to thereby cut off two of the extended corners of the aperture formed by the slides C, or for varying the length of two of the extended corners with respect to the other two, so that in use I may present either a rectangular aperture, one with two extended corners or one with four extended corners, each aperture so presented being susceptible of adjustment to any desired size by moving the slides upon each other.

Against the slides E E is placed a disk F having concentric slots $f\ f$ therein through which the pins $a^2$ pass and eccentric slots $f'$ which engage the pins or studs $e'$ of the slides E. The disk F is also provided at its outer edge with a projection F' and centrally with an opening F² similar to the opening in the disk B, the projection F' having rack-teeth which are engaged by the mechanism for turning the disk, as will be hereinafter set forth.

G designates a centrally apertured disk which is placed against the disk F and is provided with perforations $g$ through which the pins $a^2$ pass for holding the disk stationary. The disk G is also provided with projecting studs $g'$ which pass through slots in arms or bars $g^2$ placed against said disk, the arms being connected at their outer ends to a ring G' which surrounds the disk G. This ring is provided at its outer edge with a segment-rack $g^3$ with which engages the mechanism for moving the same, and it will be noted that by moving the arms over or across the aperture in the diaphragm they will obstruct a part of said aperture or opening.

After the slides and disks have been properly positioned between the annular plates A and A' of the lens-tube as hereinbefore described the parts of the lens-tube are connected together by any suitable means and a flanged segment I is placed over the edge of the plates A and A' so as to cover the recesses therein. The segment I is provided with an enlarged portion I' with a central recess which receives a pinion $i$ having a hollow shank which passes through one side of the enlarged portion I' and is attached to a thumb-nut K. This pinion meshes with the rack-teeth $a'$ on the edge of the annular plate A. Through the other side of the enlarged portion I' and the hollow shank of the pinion $i$ passes the shank of a thumb-nut L, said shank carrying a pinion $l$ which lies adjacent the pinion $i$ and meshes with the segment-rack F' on the edge of the disk F, the shank also passing through the aperture in the projecting portion of the disk B and is retained in place by a suitable nut bearing against the thumb nut K. It will be noted that the pinion $l$ which is in rigid engagement with the thumb-nut L meshes with the toothed segment F' so that by turning said thumb-nut the disk F is turned to adjust the plates E, and after the plates are adjusted the pinion $l$ is held in locked engagement with the movable disk by means of the pointer $i^4$ engaging the thumb-nut. When the thumb-nut K which carries the pinion $i$ is operated said pinion will move over the rack-teeth $a'$ and the shaft engaging with the apertured lug $b$ will carry with it the disk B from which said lug projects; and it will be especially noted that when the nut K is turned and the nut L held in locked engagement with the segment by virtue of the mesh of the pinion $l$ with the toothed segment F' the disk F will be dragged along with the segment and nut K.

The segment I has suitable gage-marks $i^2$, and a pointer, $i^3$, is attached to the side of the annular plate A of the lens-tube, said pointer being used in connection with the gage-marks to determine the position of the segment and parts of the diaphragm. The enlarged portion of the segment I also carries a pointer, $i^4$, which is made of spring metal and bears upon the thumb-nut L entering recesses in the periphery thereof to provide locking and registering means therefor.

The ring G' is operated by a thumb-nut M having a stub-shaft which carries a pinion $m$ in mesh with the teeth on the projecting portion $g^3$ of the ring, the shaft being supported by projections formed on one of the annular plates of the lens-tube at any part thereof which does not interfere with the movement of the segment I, and this thumb-nut may be provided with suitable marks or gages to indicate the position of the arms or bars $g^2$.

The lens-tube and diaphragm hereinbefore described are used with a camera having a plate-holder, and in front of the plate-holder is secured a grating or screen, S, the device being intended primarily for the production of half-tone negatives.

The plate-holder and camera-box may be of any preferred construction, and as the grating or screen may be ruled with lines running parallel with the edges of the plate or diagonally across the same the lens-tube is attached to the camera-box so that it may be turned to bring the corners of the rectangular aperture in the diaphragm in proper position with respect to the apertures in the grating or screen.

In making half-tone negatives using an ordinary cross-line screen and the usual diaphragm with a circular aperture the result is to produce upon the sensitive plate through each aperture in the screen a perfect reproduction of the aperture in the diaphragm. With a diaphragm having apertures of the different characters hereinbefore described the effect in the reproduction of the rectangular aperture is obliterated by the others and a better effect produced, it being understood that the different apertures are used according to the subject to be reproduced, one form modifying the others. The invention also provides for varying the size of each of the different characters of aperture.

In connection with the lens-tube and diaphragm hereinbefore described I may use what is known in the trade as an iris diaphragm or the equivalent thereof, for producing a round aperture.

In operation when it is desired to provide the diaphragm with a rectangular aperture the nut L is set so that the pointer which engages therewith will be in the first recess or notch, and this holds the nut against rotation so that the disks B and F will retain their relative positions and when the segment I is moved will operate the slides C and E to increase or diminish the size of the rectangular aperture, the size of the aperture being indicated by the pointer $i^3$ and gage marks on the segment. Now to produce a rectangular aperture having two extended corners the thumb-nut L is turned which moves the disk B to move the inner edges of the slides C within the rectangular aperture formed by the slides E, and then by locking the nut L and turning the thumb-nut K the size of such an aperture can be varied, as the disks B and F retain their relative positions through the variations. A further turning of the nut L would move the slides C with respect to the slides E to give an aperture with four extended corners, two of which would be longer than the other two; this difference in length being produced by the rectangular aperture in one of the slides E being at a greater distance from the axis of the lens than the other, as hereinbefore set forth. When it is desired to block out the center light or throw the arms $g^2$ across the aperture formed by the slides C and E, the thumb-nut M is turned and carries with it the pinion $m$ which engages the rack $g^3$ and moves the ring to which the arms are connected so as to position the arms across the aperture, their inner ends lying one above the other. By this construction I am enabled to obviate to a great extent the reproduction of the lens-aperture and attain a much better result in practice than it is possible to obtain with a single form of diaphragm. It depends upon the subject to be copied or reproduced and the intensity of the light, time of exposure, &c., as to whether it is necessary to use in combination with a rectangular aperture an aperture having two or four corners extended and one with the central light blocked out.

Having thus described my invention, what I claim as new, and desire to secure by Letters Patent, is—

1. A diaphragm for photographic lens-tubes, having adjustable slides with apertures which are extended at their corners, and means in connection therewith to present a rectangular aperture with extensions at two of the corners thereof.

2. In a photographic lens-tube, the combination, of a plurality of slides each having a rectangular aperture with an extended corner, and means in connection therewith to form a diaphragm having a rectangular aperture with extensions at the corners thereof, the length of two of the extensions being different from the other two, substantially as shown.

3. In a photographic lens-tube, the combination, of the adjustable slides having rectangular apertures with extended corners and slides having rectangular apertures the center of one of which is farther from the axis of the lens than the other, for the purpose set forth.

4. In a photographic lens-tube, the combination, of the slides C having apertures with extensions at the corners thereof and slides E having rectangular apertures the center of one aperture being farther from the axis of the lens than the other, and means for adjusting one of the slides independently to increase or diminish the size of the apertures or extensions at the corners, for the purpose set forth.

5. In a lens-tube, the combination, of a plurality of similar slides having rectangular apertures with extended corners, the center of the aperture formed by the slides being on a line with the axis of the lens, together with a pair of slides having rectangular apertures the center of one of the apertures being on a line with the axis of the lens and the other out of line therewith, substantially as shown, and means for adjusting the slides together and one independent of the other.

6. In a photographic lens-tube having annular plates attached thereto, the edge of one of the plates having teeth formed thereon, of a disk movable with respect to the lens-tube and provided with slots and a projecting portion through which passes a spindle carried by a movable plate or segment, a pinion fixed to the spindle and engaging the teeth on the annular plate, together with slides actuated by the disk to increase or diminish the size of the aperture formed by apertures in said slides, substantially as shown.

7. In a photographic lens-tube constructed substantially as shown and provided with slides having apertures of different characters, of a plate adapted to move over the lens-tube, said plate having gage-marks and carrying thumb-nuts one of the latter having recesses or notches which serve as gage-marks, one of the thumb-nuts being adapted to operate both sets of slides and the other one set, whereby the size of the aperture formed by the slides can be varied and the character of the same changed, for the purpose set forth.

8. In a photographic lens-tube, the combination, of slides having apertures of different configurations, means for adjusting one of the sets of slides and locking such adjusting means so that the size of the aperture formed by the slides may be varied without changing the shape of the aperture.

9. In a photographic lens-tube having two sets of slides with apertures of different characters, means for moving said slides so as to present a rectangular aperture, an aperture having two extended corners or one having four extended corners two of which are of less length than the other two, the adjusting means for one of the sets of slides being provided with locking means whereby when the slides have been adjusted to form an aperture having one of the characters set forth the size of such aperture can be increased or diminished without changing the characteristics thereof.

10. A lens-tube for cameras having annular plates with recesses $a^3$ and pins $a^2$, the outer edge of one of the plates being provided with teeth $a'$, and the other plate being cut away on a line with said teeth, disks B and F for operating slides which engage therewith and with the pins $a^2$, one of the disks having an apertured projection and the other a projection with teeth formed thereon, in combination with a plate I having thumb-nuts K and L, one of the thumb-nuts having a spindle which passes through the projecting portion on one of the disks, and pinions carried by the thumb-nuts and adapted to engage with the rack-teeth on the annular plate and with the rack teeth on the disk, substantially as shown, whereby the slides can be adjusted to increase and diminish the size of the apertures therein or change the configuration of the same.

11. In combination with a lens-tube for photographic cameras, a suitably supported thumb-nut carrying a pinion, a ring having rack-teeth with which the pinion engages, arms pivoted to the ring, said arms engaging with studs or fixed pins, substantially as shown, so that the arms can be positioned over the center of the aperture in the lens-tube, for the purpose set forth.

In testimony whereof I affix my signature in presence of two witnesses.

MAX LEVY.

Witnesses:
G. SARGENT ELLIOTT,
EUGENE W. JOHNSON.